United States Patent
Scerbo, III

[11] Patent Number: 5,400,185
[45] Date of Patent: Mar. 21, 1995

[54] EVIDENCE RECORDER AND METHOD OF SECURING

[76] Inventor: Frank C. Scerbo, III, P.O. Box 5271, Parsippany, N.J. 07054

[21] Appl. No.: 272,077
[22] Filed: Jul. 8, 1994
[51] Int. Cl.$^6$ ............................. G11B 5/00; H04B 1/34
[52] U.S. Cl. .......................................... 360/5; 348/143; 348/335; 455/100
[58] Field of Search ...................... 360/5, 57; 348/143, 348/151, 152, 335, 158; 455/100, 351, 66, 18, 89; 340/825.7; 354/81; 42/1.01, 106; 358/479; 381/169

[56] References Cited

U.S. PATENT DOCUMENTS

| | | | |
|---|---|---|---|
| 3,868,573 | 2/1975 | Holcomb et al. | 455/89 |
| 4,067,015 | 1/1978 | Mogavgro et al. | 340/825.7 |
| 4,107,611 | 8/1978 | Holcomb et al. | 455/66 |
| 4,197,497 | 4/1980 | Phelps | 455/18 |
| 4,420,238 | 12/1983 | Felix | 354/81 |
| 4,541,191 | 9/1985 | Morris et al. | 42/1.01 |
| 4,700,397 | 10/1987 | Zimmermann et al. | 381/169 |
| 4,884,132 | 11/1989 | Morris et al. | 358/479 |
| 4,936,037 | 6/1990 | Holcomb et al. | 42/106 |
| 5,012,335 | 4/1991 | Cohodar | 348/158 |

Primary Examiner—A. Psitos
Assistant Examiner—Patrick Wamsley
Attorney, Agent, or Firm—William T. Hough

[57] ABSTRACT

A non-erasing audio and/or video tamper-proof recorder is mounted on a belt secured to the body of the taping person, and uses a preidentified recording substrate such as a tape or disk or cassette of which its assigned code identity is maintained in separate distant locked records and stationary files thereof by separate security storage personnel after recording is completed on the recording substrate. There is body mounting structure that secures the recorder in a security fashion avoiding ability to rapidly remove the recorder and/or its enclosed recording substrate from the body of the taping person. The recorder includes multiple coordinated turn-off switching elements requiring use of both hands to terminate (turn-off) taping. The recorder contains a microphone and/or video lense positioned in an orientation for recording events occuring substantially in front of the person wearing the mounted recorder. The recorder includes a code mechanism required to be actuated in order to open the recorder to remove a previously inserted recording substrate.

31 Claims, 2 Drawing Sheets

FIG. 4A
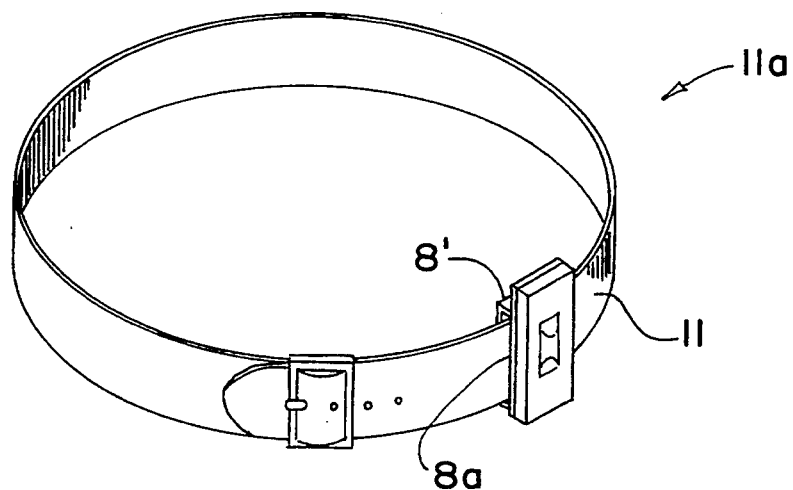
FIG. 4B
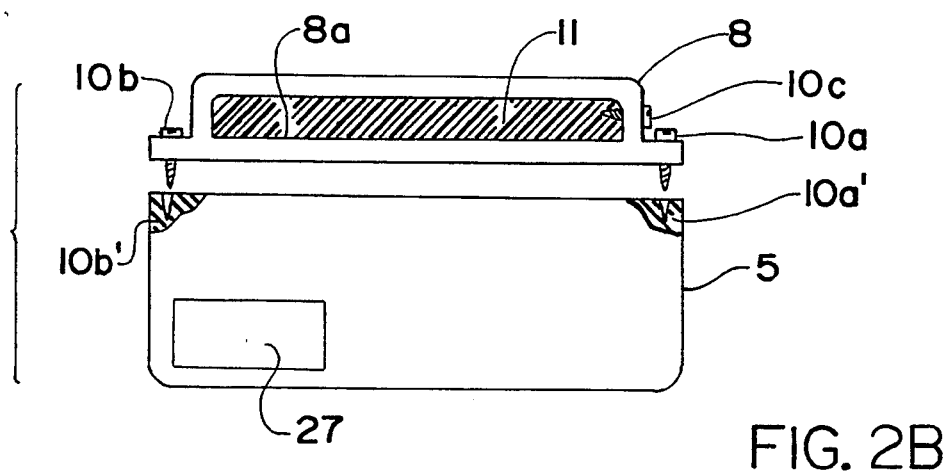
FIG. 2B

EVIDENCE RECORDER AND METHOD OF SECURING

PRIOR ART

A prior art investigation in United States Patent and Trademark Office Class 348, subclass 158, class 358, subclasses 125 and 229, and class 354, subclasses 293 and 81 failed to locate any relevant prior art. Patents located that are of mere interest include (1) Mogavero et al. U.S. Pat. No. 4,067,015 issued Jan. 3, 1978 re a stage computer-tracking combination for tracking locations of actors on stage, (2) Felix U.S. Pat. No. 4,420,238 issued Dec. 13, 1983 re a pivotable video camera mounted in an automobile trunk, controllable from within the front-seat passenger compartment, and Cohodar U.S. Pat. No. 5,012,335 issued Apr. 30, 1991 relating to a automobile dashboard-mountable pivotable camera portably removable and transportable during movement distant from the auto mounting mechanism.

BACKGROUND TO THE INVENTION

Due to the alarming number of law suits and complaint of both criminal and civil nature, lodged against police officers recently, nationwide, it has become imperative that means be provided to enable police personnel to authenticate the record as a mechanism of both protecting the police officer against fraudulent and/or misguided claims of persons of the public, and protecting the public simultaneously against excessive force and/or misguided and/or evidence collection errors, while concurrently providing indisputable court-admissible evidence of events that transpired during the performance of the police officer's on the job duties. While recording devices mounted within a police vehicle have served to be beneficial to some extent, it is impossible for such devices to follow a police officer distantly away from the recorder-mounting vehicle, into the woods, and/or around a corner, and/or into a dwelling, or the like. Too often, in the attempted performance of his duties, an officer does not have a back-up other officer present, and/or the two or more officers have momentarily become separated. When an officer alone is attacked or otherwise abused or threatened, too often it is the mere word of the officer(s) against the word(s) of one or more violators and/or perpetrator(s) of the law and/or order. Too often, officers in perfect and/or desired performace of their duties to protect the public and/or public interest, end up being maliciously and unjustly accused and often convicted, or at-least discouraged. Such undesired results cause good and honest policemen to shun their duties and/or to withdraw from public service as policemen. It is noteworthy that hesitation caused a policeman because of his reservation of being falsely accused, can and perhaps already has resulted in injury and/or death of police officers, that otherwise would not have occured if the officer had not been intimidated by such potential unjust attacks by perpetrators of the law.

Also with even the video or other tapes, such as aforenoted video camera recorded tapes, are devoid of use of accompanying proper procedure that might assure admission in court as admissible evidence, because of particular technicalities in the handling and/or potential tampering therewith after recording.

OBJECTS OF THE INVENTION

Apart from objects readily apparant from preceding background discussion, other objects are as follow.

Another object is to avoid and/or overcome deficiencies and/or difficulties and/or problems associated with current devices such as evidenced by the prior art.

Another object is provide an authorized enforcement officer with an evidence-taking and preservation tool not heretofore available.

Another object is to provide for and to preserve irrefutable evidence of events for authenticating events when an officer and/or perpetrator is/are injured and/or killed and/or incapacitated.

Another object is to provide an official record by which an officer and/or a perpetrator may refresh his/her/their memory or memories.

Another object is to provide audio and/or video admissible evidence that reveals the actual and realistic emotional environment and actual demeanor of each of perpetrator(s), surrounding person(s) and/or crowd(s) of persons and/or officer(s) during the performance of the duties of the officer(s), to thereby place in perspective such matters in the eyes of jurors.

Another object is to authenticate act(s) and/or injury(ies) of and/or to each of officer(s) and/or perpetrators and/or by bystander(s) and/or the crowd(s) prior to, during and after the main event of the performance of an officer's duty(ies).

Another object is to authenticate matters and/or things and/or objects and/or material (such as hazardous materials and/or situations), present at the time of the attempted and/or actual performance of on the job duties of an officer.

Another object is to enhance an officer's ability to record events during the occurance thereof which would otherwise be impossible to do away from the vehicular radio or video camera and/or during an auto or foot chase or the like when the officer cannot attend to normal procedures that would be necessary to make such recorded record.

Another object is to inhibit unlawful and/or illegal acts and/or hostility by would-be assailants or the like before, during and after arrests and/or investigation, because of their knowledge of the fact that such events are being officially recorded.

Another object is to free officers from the consequence of their legitimate performance of duties devoid of distractions that potentially could cause injury to themselves and/or to other officers and/or innocent bystanders of the public.

Other objects become apparent from the preceding and following disclosure.

BROAD INVENTION

Broadly the invention is directed to a security person-mountable recorder comprising in combination, (a) audio and/or video recorder, (b) a recording substrate for the audio and/or video recorder, and recorder securing structure(s) and mechanisms thereof that substantially non-removably mount the recorder onto the evidence-taking person as to deter unauthorized speedy removal of the recorder and/or recording substrate from the body or person of the evidence-taking person.

More particularly, the recorder includes typically conventional recording structure(s) and mechanism(s) thereof utilized in and for recording at-least one of audio and video signals, together with for providing critically essential interior space for securably containing a recording substrate therein and for intermittently locking and unlocking a recording substrate therein. Also, critically essential is any one of typically conventional elements and mechanisms thereof necessary for intermittent alternate code-locking and unlocking a recording substrate detainably within said space.

The recording substrate is critically required to be alternately insertable into and removable from said space, to enable the following of procedures that result in admissible evidence. The recording substrate is recordable of signal(s) that are at-least one and acceptably both of audio and video signals; and The recorder securing strtucture(s) and mechanism(s) thereof, provide for intermittently substantially fixed and long-term mounting of said recording means onto at-least one of (1) a wearer-person and (2) an article secured to a wearer-person. The mounting is critically required to be in an orientation by which the recording structure(s) and mechanism(s) thereof is functional to record on the recording substrate the signals—otherwise the device being useless/devoid of utility. Also, the mounting structure(s) and mechanism(s) thereof critically provide for intermittent detachment of the recording structure(s) and mechanism(s) thereof, with the intermittent detachment critically requiring delayed detachment over a substantially major time lapse sufficient to discourage at least one of unlawful or unauthorized quick detachment from the wearer-person—for example to avoid an overpowered police office from having the recorder and/or recording substrate quickly removed from the officer's person—noting that such delay encountered in any attempted removal would result almost universally in the perpetrator(s) abandoning the attempt for fear of being apprehended or seen prior to his/her/their escape.

In a first preferred embodiment, as an improvement on the foregoing-described broad invention of preceding paragraphs, the recording structure(s) and mechanism(s) thereof critically is/are non-functional for erasing the signals when the signals are in a state of having been recorded on the recording substrate by the recording structure(s) and mechanism(s) thereof. Such feature for this preferred embodiment is essential thereto, to prevent attempted and/or successful erasing of incriminating evidence when the perpetrator(s) has/-have overpowered an officer. Likewise, such feature also prevents an officer from altering (selectively-erasing) evidence that potentially would (might) reveal improper procedure and/or the presence of excessive force or the like.

In a second preferred embodiment as an improvement on the foregoing-described first preferred embodiment of the recording substrate critically includes identification that is at-least one of inseparable structure and recorded identifiable data that is specifically identifiable of that particular recording substrate, thereby providing for enhanced preservation of identifiable elements of the preserved evidence. Also, as a part of this preferred embodiment, separate records critically exist that include the aforestated particular identification—which records are also critically maintained at a location distant from the recording structure(s) and mechanism(s) thereof. Thereby, the perpetrator(s) acts, as well as the honest and correct acts of the officer(s) is/are for evidentiary purposes preserved and assured to be routinely preserved by an independent security officer and storage files.

In a third preferred embodiment, as an improvement of the second preferred embodiment, the aforestated location critically is within the aforestated locked files. Those files are of a physical nature and type as to be intermittently unlockable and critically maintainable solely apart from and away from the recording structure(s) and mechanism(s) thereof and apart from and away from the wearer-person designated to utilize the recording substrate. Thereby, separate probative record of each separate recording substrate is maintainable; such locked files are included as a critical part of this preferred combination, the locked files being of at-least one of size and shape as to be substantially fixed immovable file structure whereby the identification is assured of being non-transportable by and independent from the wearer-person on which the recording structure(s) and mechanism(s) thereof is mounted by the recorder securing structure(s) and mechanism(s) thereof.

In a fourth preferred embodiment, as an improvement of the third preferred embodiment, the recording structure(s) and mechanism(s) thereof critically include(s) an off-on switch for alternately beginning at-least one of initial and continuing recording on the substrate. Also critically included as an integral part of the recording structure(s) and mechanism(s) thereof further is/are at-least on-lock structure(s) and mechanism(s) thereof of a conventional nature, having multiple deactivation switch members jointly functional to stop recording of the signals solely when jointly concurrently actuated. At-least two of the plurality of switch members are sufficiently removed from one-another as to require use of both hands—reducing the probability of accidental turning-off during a struggle and/or by accidental striking thereof on some object.

In a fifth preferred embodiment, as an improvement of the fourth preferred embodiment, the recorder securing structure(s) and mechanism(s) thereof critically include(s) tamper-proof screws securably mountable for at-least partially attaining the substantially fixed and long-term mounting. Thereby, any unathorized attempt of assailant(s)—who has/have overpowered a police officer will find it literally impossible to "rapidly" remove the recorder from its mounted state—such delay increasing the likelihood that the assailant(s) would attempt to promptly or immediately flee, rather than risk the further possibility of arrest, being seen, and/or further problems to themselves.

In a sixth preferred embodiment, as an improvement of the fifth preferred embodiment, the recording structure(s) and mechanism(s) thereof critically include(s) integral microphone(s) in mounted critical orientation by which (as a result of which) distantly (removed, far-away) spoken sound is ascertainable and recordable as the signals. Devoid of such, would defeat the preferred utility of this preferred embodiment.

In a seventh preferred embodiment, as an improvement of the sixth preferred embodiment, there is included including the aforestated article as a required part of this preferred combination. The aforestated article consists essentially of a body-mountable belt (commonly referred to as a police belt of heavy wide leather constructions with braids or the like anchoring the parts thereof together) having body-mounting fastening structure of a type requiring extended dismounting time of at-least one minute. Such extended time can seem a life-time to a perpetrator intent on making a speedy getaway or departure, such minimal required time being most likely sufficient for this preferred embodiment.

In an eighth preferred embodiment, as an improvement of the seventh preferred embodiment, the body-mounting fastening structure is of a type requiring at-least three minutes. This longer delay of the perpetrator further enhances and guarantees avoidance of loss of the recorder and/or tape thereof to a perpetrator, for this preferred embodiment.

In a ninth preferred embodiment, as an improvement of the eighth preferred embodiment, the aforestated intermittent detachment requires delayed detachment over a critical period of three minutes for this preferred embodiment. Likewise this greater detachment delay enhances and substantially guarantees the probability of no theft by a perpetrator that has overpowered a police officer.

In a tenth preferred embodiment, as an improvement of the ninth preferred embodiment, the aforestated body-mountable belt includes at-least one horizontally-extending strap when mounted on the wearer-person. Additionally for this embodiment, the aforestated recorder securing structure(s) and mechanism(s) thereof includes structure for mounting the recording structure(s) and mechanism(s) thereof in an upright forwardly-facing direction, thereby critically adapted to fit the conventional horizontally arranged police belt support structure.

In a eleventh preferred embodiment, as an improvement of the tenth preferred embodiment—as an alternate to the tenth preferred embodimentt, the body-mountable belt includes at-least one diagonally-extending strap when mounted on the wearer-person, and in which the recorder securing structure(s) and mechanism(s) thereof includes structure for mounting the recording structure(s) and mechanism(s) thereof in an upright forwardly-facing direction, thereby critically adapted to fit the conventional diagonally arranged police belt support structure.

In a twelfth preferred embodiment, as an improvement on the aforestated broad invention, there is the same improvement as the second preferred embodiment.

In a thirteenth preferred embodiment, as an improvement on the aforestated broad invention, there is the same improvement as the second preferred embodiment.

In a fourteenth preferred embodiment, as an improvement on the aforestated broad invention, there is the same improvement as the third preferred embodiment.

In a fifteenth preferred embodiment, as an improvement on the aforestated broad invention, there is the same improvement as the third preferred embodiment.

In a sixteenth preferred embodiment, as an improvement on the aforestated broad invention, there is the same improvement as the fourth preferred embodiment.

In a seventeenth preferred embodiment, as an improvement on the aforestated broad invention, there is the same improvement as the fifth preferred embodiment.

In an eighteenth preferred embodiment, as an improvement on the aforestated broad invention, there is the same improvement as the sixth preferred embodiment.

In a nineteenth preferred embodiment, as an improvement on the aforestated broad invention, there is the same improvement as the seventh preferred embodiment.

In a twentieth preferred embodiment, as an improvement on the aforestated broad invention, there is the same improvement as the eighth preferred embodiment.

In a twenty-first preferred embodiment, as an improvement on the aforestated broad invention, there is the same improvement as the ninth preferred embodiment.

In a twenty-second preferred embodiment, as an improvement on the ninth preferred embodiment, there is included sealing structure and mechanism thereof for sealing-closed said recording substrate subsequent to completion of recording on said recording substrate and its removal from said recording means.

In a twenty-third preferred embodiment, as an improvement on the aforestated broad invention, there is the same improvement as the aforestated broad invention, there is the same improvement as that of the twenty-second preferred embodiment.

A method of obtaining irrefutable evidence of conduct of a recorded person, comprising employing the security person-mountable recorder of the aforestated sixth preferred embodiment, the aforestated employing including:

a) establishing identifiable data on the recording substrate;

b) thereafter locking the recording substrate within the recording substrate interior space;

c) substantially fixed and long-term mounting the recording structure(s) and mechanism(s) thereof onto at-least one of (1) the wearer-person and (2) an article secured to the wearer-person, arranged in the aforestated orientation by which the recording structure(s) and mechanism(s) thereof is/are functional to record on the recording substrate the signals;

d) thereafter recording at-least one of audio and video signals, creating the identifiable data to be specifically identifiable of the recording substrate; and e) thereafter removing the recording substrate and substantially simultaneously thereafter placing and storing the recording substrate with the separate records at the distant location within the locked files.

As a first preferred method embodiment of the aforestated method, there is included the step of maintaining the identification in the separate records within the locked files maintained at the location distant from the recording structure(s) and mechanism(s) thereof.

As a second preferred method embodiment as an improvement on the first preferred embodiment of the aforestated method, there is included the additional step of at-least one of prior to, simultaneous with and subsequent to the establishing of the identification, establishing the separate records at the location and placing the separate records under security of a security person other than the wearer-person.

As a third preferred method embodiment as an improvement on the second preferred method embodiment, there is included the step of applying sealing structure and mechanism thereof to said recording substrate sufficiently to seal-closed said recording substrate subsequent to completion of recording on said recording substrate, after removal of the recording substrate from said recording means.

As a fourth preferred method embodiment as an improvement on the aforestated broad method, there is the same additionally included step as that of the third preferred method embodiment.

The invention may be better understood by making reference to the following drawings.

THE FIGURES

FIG. 1 diagrammatically and symbolically illustrates a combination audio-video recorder in a perspective front and side view thereof, with partial cut-away showing a disk or cassette recorder-substrate device mounted therein positioned behind the locked door to the mounting space.

FIG. 2A diagrammatically and symbolically illustrates the combination audio-video recorder of FIG. 1, shown in perspective back and opposite side and top view, including the mounted belt-receiving structure secured to the back.

FIG. 2A' diagrammatically and symbolically illustrates an in-part and exploded view taken from FIG. 2A, illustrating typical details of tamper proof screw (or bolt) mountings.

FIG. 2B diagrammatically and symbolically illustrates an exploded typical view of the bottom a recorder such as that of FIG. 1, illustrating further the mechanism of typical attachment of a belt-mounting structure with typically tamper proof screws.

FIG. 3A diagrammatically and symbolically illustrates a typical cassette or disk, i.e. recorder substrate of a miniature size, representative of typical appearance thereof for either or both sound (audio) and/or video recording, shown in side and top perspective view.

FIG. 3B diagrammatically and symbolically illustrates a sealed cassette or disk of the typical type shown in FIG. 3A, as it appears after recording and after removal of the cassette or disk, i.e. the recording substrate, from the recorder's mounting space.

FIG. 4A diagrammatically and symbolically illustrates a typical police-type mounting belt having a horizontal mounting orientation, shown in front perspective and side view.

FIG. 4B diagrammatically and symbolically illustrates a typical police-type mounting belt having a diagonally angled mounting orientation, shown in front perspective view.

DETAILED DESCRIPTION

FIG. 1 illustrates a combination audio-video recorder 5 (i.e. cam-corder) showing a disk or cassette recorder with the recording-substrate device 6 mounted therein positioned behind the locked door 16 to the mounting space 7.

FIG. 2A illustrates the combination audio-video recorder 5 of FIG. 1, including the mounted belt-receiving structure 8 secured to the back.

FIG. 2A' illustrates typical details of tamper-proof screw mountings.

FIG. 4A illustrates a typical police-type mounting belt 11a having a horizontal mounting orientation.

FIG. 4B illustrates a typical police-type mounting belt 11b having a diagonally angled mounting orientation.

Figure 1:
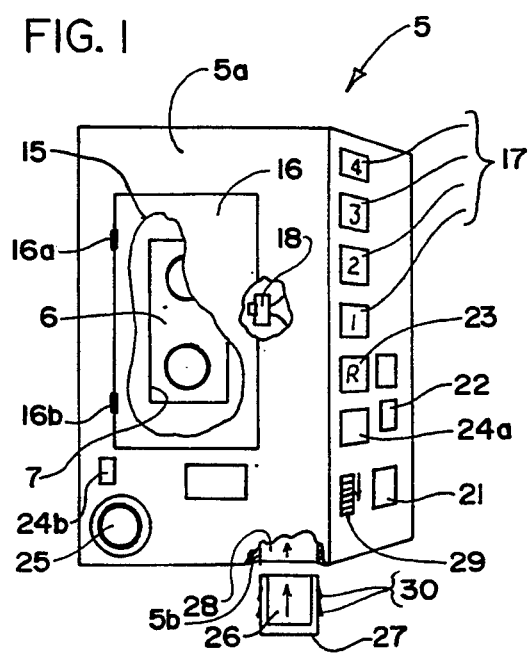

In greater detail, FIG. 1 shows in the cut-away 15 the recording substrate 6 mounted within the space 7 of the recorder 5. On a front face 5a there is the cassette-insertion code-lockable door 16 mounted on hinges 16a and 16b. The lock 18 is releasable from locking engagement by punching-in a predetermined coded number utilizing a plurality of code-buttons 17 (typically carrying recorder code numbers #1, #2, #3, and #4 ) as shown, utilizing any predetermined combination code by which each or-any one or more of the code-buttons 17 may be punched one or more times as a part of a multidigit code number. Any of other conventional or equivalent, locks may be equivalently substituted, the nature of the lock not being the essence of the invention, except being required to be critically sufficient to provide strong-box type securing-locking of the code-lockable door 16 mounted on spring-biased hinges, to automatially spring-open the door 16 whenever the lock, release is actuated. There is provided a conventional but strategically oriented (aforestated) microphone 19 on the forward face 5a from which audio electronic signals are sent to the recorder audio recording mechanism resulting in audio recording on the recording substrate. There is no "play" nor play-back, nor speaker therefor, nor any rewind nor re-record switches nor such capabilities, the recorder not having any erase capability—thereby preventing changing, erasing or otherwise altering recorded evidence. Light 21 (typically red) comes-on when battery-power is at a predetermined level deemed to be sufficiently low as to be in need of recharge and-/or when the tape has been recorded to its end—requiring replacement with a fresh unused tape. Eject-button, 21 for spring-ejecting the recording substrate (cassette, tape, disk or the like) is operative by punching the same, but typically operative solely when recording is not taking place, i.e. when in the "off" mode—such being conventional technology. There is the turn-on button 22 and the initiate-record button 23 (showing an R), and dual, matched spaced-apart stop-record switches 24a and 24b—which must be concurrently pressed in order to function. Also mounted on this same forward face 5a is the video lens 25 for receiving and transmitting received-light-images to the recorder-embodied conventional video recorder for recording the electronic video signals. The tape and/or disk or other desired and/or conventional recording substrate disk or the like, may be adapted to concurrently both record audio and video, or alternately there may be provided separate, i.e. dual systems within the same or different recorders, one for video recording and the other for audio recording on the same or separate tapes. Such electronic sound and/or video unit(s) use well known and conventional electronic technology, the electronic mechanisms not constituting the essence of this invention. For the illustrated battery 26 (typically rechargeable) and battery-support insertable casing 27 for insertion into conventional battery-driving structure's battery-receptacle space 28 of bottom face 5b, there is the release button 29 on side face 5c for release of a conventional locking mechanism that engages insertable typical barbs 30 when inserted to become thereby locked-in; such mechanism is conventionally well-known and conventional for such merely typical or may have substituted therefor any other desired substantially equivalent conventional battery lock-in mechanism.

Figure 2A:
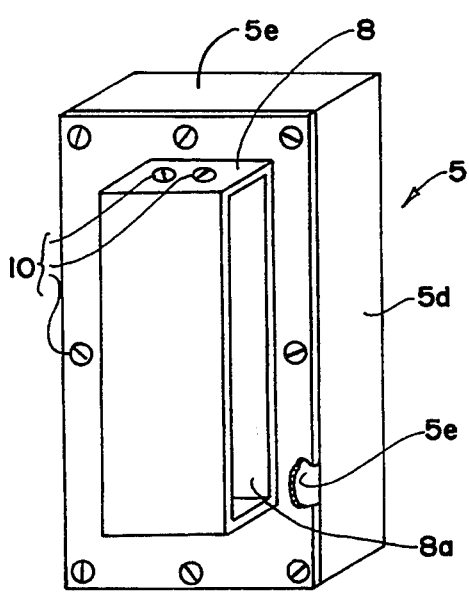
FIG. 2B illustrates further the mechanism of typical attachment of a belt-mounting structure with typically tamper proof screws, to the recorder 5 and belt (strap) 11.
Figure 2A:
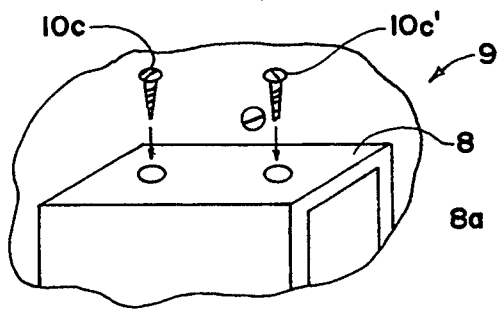

FIG. 2A illustrates the same recorder 5 as viewed from an opposite perspective view, showing the other face 5d and the top face 5d, and back face 5e. The back face 5e (as viewed through a cut-away portion of the drawing) mounting through-space mounting frame 8 through which a police strap or belt 11 (per FIG. 2B) is threaded and secured by typically securing tamper-proof screws 10 that anchor the mounting frame 8 to each of a belt (or strap) and the back face 5e.

FIG. 2A' shows an in-part view of FIG. 2A in an exploded view of the typical conventional tamper-proof screws 10c and 10c' employed as a part of the belt-securing mechanism when the belt is threaded through the through-space channel 8a.

Figure 3A:
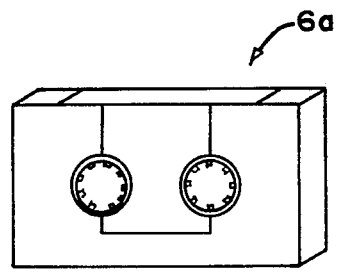
FIG. 3A illustrates a typical cassette or disk 6a, i.e. recorder substrate 6 of a miniature size, representative of typical appearance thereof for either or both sound (audio) and/or video recording.

FIG. 3A illustrates a typical and conventionally-appearing tape (tape-cassette 6a of the type the is available embodying the recording substrate, for example for sound (audio) recordings, embodying audio recording tape, typically of the type shown in FIG. 1, as it would appear prior to or during recording.

Figure 3B:
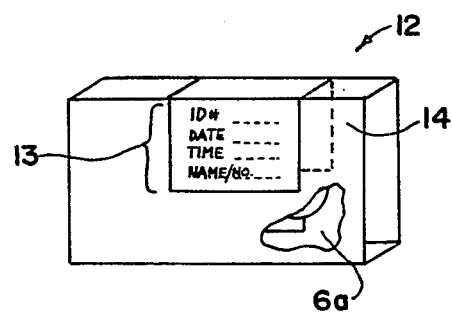
FIG. 3B illustrates a sealed enclosure item 12 after recording and after removal of the cassette or disk, i.e. the recording substrate, from the recorder's mounting space and the sealing thereof.

FIG. 3B illustrates the appearance of a sealed unit 6a, with partial cut-away showing the tape cassette 6a (or the like) enclosed by an envelope 14 sealed-closed by a stick-seal label 12 having been applied thereto across (sealing) the opening thereto, carrying typically spelled-out identification of data required to be filled-in at the time of sealing of the tape carrying the recorded data—as sealing label 13, carring indicia (writing) provisions 13 for insertion of typical data such as the code-number assigned (ID#), the date, the time, and the Officer-name who made the recording.

FIG. 4A illustrates a front perspective view of a conventional fastened police horizontal belt threaded through the channel 8a of the mounting frame 8' locked onto the belt 11.

FIG. 4B illustrates a front perspective view of a conventional fastened police diagonal belt strap threaded through the channel 8a' of the mounting frame 8" locked onto the belt 11'.

FIG. 2B illustrates the securing of the mounting frame 8 by the securing tamper-proof screw 10 with the mounting frame 8 mounted on the recorder as shown with partial cut-aways 10a' and 10b' in exploded views. This view also show the bottom face 5b, with the inserted battery support insertable casing 27.

Through the utilization of the present above-described invention, evidence of the events as they actually occur, with the loudness and/or emotion present and/or with the full surrounding environment such as provacative components, refusal to respond to police orders, threatening language, and the like, all are evidenced and recorded for the evidentiary observation by the jury at the time of trial, preserved by all necessary provisions assuring it to be admissible evidence of the actual events during the performance of the duties of and by the police officer. Likewise, in the event of injury and/or death to either the offender and/or the police officer, the taped data by this invention will be available to ascertain who is telling the truth and who is not.

Immediately upon removal of a tape—in absence of continuing critical police duties, at first opportunity the police officer labels the sealing label, places the recorded tape into its sealable envelope, and seals the same with the sealing label, and upon return to the station, turns-over the sealed tape and envelope sealed containing the same, to the security officer in charge of placing such tapes into a secured locked depository or safe or the like, for safe keeping. Thereafter, such tape may be withdrawn and reviewed solely in the presence of both assigned police and/or court officer(s) together with the defendant(s)'s attorney all concurrently present, for their concurrent first review thereof in the presence of one-another. At that time, copies may be made, also in the presence of the attorney and the assigned officer(s).

It is within the scope of the present invention to make such variations and/or substitution of equivalents and-/or modifications as would be within the skill of the ordinary artisan in this particular art.

I claim:

1. A security person-mountable recorder comprising in combination:
   a) a recording means for recording at-least one of audio and video signals, for providing interior space for containing a recording substrate therein and for intermittently locking and unlocking a recording substrate therein and for intermittent alternate code-locking and unlocking a recording substrate detainably within said space; and
   b) said recording substrate alternately insertable into and removable from said space, said recording substrate being recordable of signals that are at-least one of audio and video signals; and
   c) recorder securing means for intermittently substantially fixed and long-term mounting of said recording means onto at-least one of (1) a wearer-person and (2) an article secured to a wearer-person, in an orientation by which said recording means is functional to record on said recording substrate said signals, and for intermittent detachment of said recording means, said intermittent detachment requiring delayed detachment over a substantially major time lapse sufficient to discourage at least one of unlawful or unauthorized quick detachment from the wearer-person.

2. The security person-mountable recorder of claim 1, in which said recording means is non-functional for erasing said signals when said signals are in a state of having been recorded on said recording substrate by said recording means.

3. The security person-mountable recorder of claim 2, in which said recording substrate includes identification that is at-least one of inseparable structure and recorded identifiable data that is specifically identifiable of that particular recording substrate, and separate records being inclusive of said identification maintained at a location distant from said recording means.

4. The security person-mountable recorder of claim 3, in which said location is within locked files that are intermittently unlockable and maintainable apart and away from said recording means and from said wearer-person designated to utilize said recording substrate, such that a separate probative record of each separate recording substrate is maintainable, and including said locked files, and said locked files being of at-least one of size and shape as to be substantially fixed immovable file structure whereby the identification is non-transportable by said wearer-person on which said recording means is mounted by said recorder securing means.

5. The security person-mountable recorder of claim 4, in which said recording means includes an off-on switch for alternately beginning at-least one of initial and continuing recording on said said substrate and in which said recording means further includes at-least an on-lock having multiple deactivation switch members jointly functional to stop recording of said signals when jointly concurrently actuated.

6. The security person-mountable recorder of claim 5, in which said recorder securing means includes tamper-proof screws securably mountable for at-least partially attaining said substantially fixed and long-term mounting.

7. The security person-mountable recorder of claim 6, in which said recording means includes an integral microphone in a mounted orientation such that spoken sound is ascertainable and recordable as said signals.

8. The security person-mountable recorder of claim 7, including said article, said article consisting essentially of a body-mountable belt having body-mounting fastening structure of a type requiring extended dismounting time of at-least one minute.

9. The security person-mountable recorder of claim 8, in which said body-mounting fastening structure is of a type requiring at-least three minutes.

10. The security person-mountable recorder of claim 9, in which said intermittent detachment requires delayed detachment over a period of three minutes.

11. The security person-mountable recorder of claim 10, in which said body-mountable belt includes at-least one horizontally-extending strap when mounted on said wearer-person, and in which said recorder securing means includes structure for mounting said recording means in an upright forwardly-facing direction.

12. The security person-mountable recorder of claim 10, in which said body-mountable belt includes at-least one diagonally-extending strap when mounted on said wearer-person, and in which said recorder securing means includes structure for mounting said recording means in an upright forwardly-facing direction.

13. The security person-mountable recorder of claim 1, in which said body-mountable belt includes at-least one horizontally-extending strap when mounted on said wearer-person, and in which said recorder securing means includes structure for mounting said recording means in an upright forwardly-facing direction.

14. The security person-mountable recorder of claim 1, in which said body-mountable belt includes at-least one diagonally-extending strap when mounted on said wearer-person, and in which said recorder securing means includes structure for mounting said recording means in an upright forwardly-facing direction.

15. The security person-mountable recorder of claim 1, in which said recording substrate includes identification that is at-least one of inseparable structure and recorded identifiable data that is specifically identifiable of that particular recording substrate, and separate records being inclusive of said identification maintained at a location distant from said recording means.

16. The security person-mountable recorder of claim 15, in which said location is within said locked files that are intermittently unlockable and maintainable apart and away from said recording means and from said wearer-person designated to utilize said recording substrate, such that a separate probative record of each separate recording substrate is maintainable, and including said locked files, and said locked files being of at-least one of size and shape as to be substantially fixed immovable file structure whereby the identification is non-transportable by said wearer-person on which said recording means is mounted by said recorder securing means.

17. The security person-mountable recorder of claim 1, in which said recording means includes an off-on switch for alternately beginning at-least one of initial and continuing recording on said said substrate and in which said recording means further includes at-least an on-lock having multiple deactivation switch members jointly functional to stop recording of said signals when jointly concurrently actuated.

18. The security person-mountable recorder of claim 1, in which said recorder securing means includes tamper-proof screws securably mountable for at-least partially attaining said substantially fixed and long-term mounting.

19. The security person-mountable recorder of claim 1, in which said recording means includes an integral microphone in a mounted orientation such that spoken sound is ascertainable and recordable as said signals.

20. The security person-mountable recorder of claim 1, including said article, said article consisting essentially of a body-mountable belt having body-mounting fastening structure of a type requiring extended dismounting time of at-least one minute.

21. The security person-mountable recorder of claim 1, in which said body-mounting fastening structure is of a type requiring at-least three minutes.

22. The security person-mountable recorder of claim 1, in which said intermittent detachment requires delayed detachment over a period of three minutes.

23. The security person-mountable recorder of claim 10, including sealing means for sealing-closed said recording substrate subsequent to completion of recording on said recording substrate and it removal from said recording means.

24. The security person-mountable recorder of claim 1, including sealing means for sealing-closed said recording substrate subsequent to completion of recording on said recording substrate and it removal from said recording means.

25. A method of obtaining irrefutable evidence of conduct of a recorded person, comprising employing the security person-mountable recorder of claim 7, said employing including a) establishing identifiable data on the recording substrate, b) thereafter locking the recording substrate within the recording substrate interior space, c) substantially fixed and long-term mounting said recording means onto at-least one of (1) said wearer-person and (2) an article secured to said wearer-person, in said orientation by which said recording means is functional to record on said recording substrate said signals, d) thereafter recording at-least one of audio and video signals, creating said identifiable data to be specifically identifiable of the recording substrate, and e) thereafter removing said recording substrate and substantially simultaneously thereafter placing and storing the recording substrate with said separate records at said distant location within said locked files.

26. The method of claim 25, including maintaining said identification in said separate records within said locked files maintained at said location distant from said recording means.

27. The method of claim 26, including at least one of prior to, simultaneous with and subsequent to said establishing of said identification, establishing said separate records at said location and placing said separate records under security of a security person other than said wearer-person.

28. The method of claim 27, including sealing-closed said recording substrate subsequent to completion of recording on said recording substrate and it removal from said recording means.

29. The method of claim 25, including sealing-closed said recording substrate subsequent to completion of recording on said recording substrate and it removal from said recording means.

30. A security person-mountable recorder consisting essentially of:
   a) a recording means for recording at-least one of audio and video signals, for providing interior space for containing a recording substrate therein and for intermittently locking and unlocking a recording substrate therein and for intermittent alternate code-locking and unlocking a recording substrate detainably within said space; and
   b) said recording substrate alternately insertable into and removable from said space, said recording substrate being recordable of signal that are at-least one of audio and video signals; and
   c) recorder securing means for intermittently substantially fixed and long-term mounting of said recording means onto at-least one of (1) a wearer-person and (2) an article secured to a wearer-person, in an orientation by which said recording means is functional to record on said recording substrate said signals, and for intermittent detachment of said recording means, said intermittent detachment requiring delayed detachment over a substantially major time lapse sufficient to discourage at least one of unlawful or unauthorized quick detachment from the wearer-person.

31. The security person-mountable recorder of claim 30, including sealing means for sealing-closed said recording substrate subsequent to completion of recording on said recording substrate and it removal from said recording means.

* * * * *